(12) United States Patent
Knapp

(10) Patent No.: US 9,385,570 B2
(45) Date of Patent: Jul. 5, 2016

(54) STATOR MAGNET WIRE END COIL RETENTION SYSTEM

(71) Applicant: John M. Knapp, Claremore, OK (US)

(72) Inventor: John M. Knapp, Claremore, OK (US)

(73) Assignee: Baker Hughes Incorporated, Houston, TX (US)

(*) Notice: Subject to any disclaimer, the term of this patent is extended or adjusted under 35 U.S.C. 154(b) by 680 days.

(21) Appl. No.: 13/758,653

(22) Filed: Feb. 4, 2013

(65) Prior Publication Data

US 2013/0200745 A1  Aug. 8, 2013

Related U.S. Application Data

(60) Provisional application No. 61/594,741, filed on Feb. 3, 2012.

(51) Int. Cl.
| | |
|---|---|
| *H02K 3/50* | (2006.01) |
| *H02K 15/03* | (2006.01) |
| *H02K 3/52* | (2006.01) |
| *H02K 5/132* | (2006.01) |
| *H02K 9/19* | (2006.01) |

(52) U.S. Cl.
CPC ............... *H02K 3/50* (2013.01); *H02K 3/522* (2013.01); *H02K 15/03* (2013.01); *H02K 5/132* (2013.01); *H02K 9/19* (2013.01); *Y10T 29/49009* (2015.01)

(58) Field of Classification Search
CPC ......... H02K 3/50; H02K 15/03; H02K 3/522; H02K 3/527; H02K 3/51; Y10T 29/49071; Y10T 29/49073

USPC .......................................... 310/260, 270–272
See application file for complete search history.

(56) References Cited

U.S. PATENT DOCUMENTS

| 3,348,085 | A | 10/1967 | Coggeshall et al. |
| 3,435,517 | A | 4/1969 | Fortenbach et al. |
| 3,991,334 | A | 11/1976 | Cooper et al. |
| 4,037,126 | A | 7/1977 | Brennan et al. |
| 4,225,800 | A | 9/1980 | Magnaghi |
| 4,833,354 | A | 5/1989 | Miller |
| 5,845,909 | A | 12/1998 | Angelo |
| 8,203,250 | B2 | 6/2012 | Parmeter et al. |
| 2002/0153784 | A1* | 10/2002 | Kanppenberger ....... H02K 3/24 310/52 |
| 2010/0187942 | A1* | 7/2010 | McCartney ............. H02K 3/50 310/214 |
| 2012/0257985 | A1* | 10/2012 | Parmeter ............... F04D 29/047 417/53 |

* cited by examiner

*Primary Examiner* — Naishadh Desai
(74) *Attorney, Agent, or Firm* — Bracewell LLP

(57) ABSTRACT

The invention includes a retention system and method for stator magnet wires. In embodiments, the retention system includes a packing ring that can swell to a larger size following installation. In embodiments, the lubricant used in the motor causes the packing ring to swell. When the packing ring swells, it exerts pressure against the end turns of the stator magnet wires, and can contour to the shape of the wires so that there are no pressure points on the wires. A rigid support ring can be positioned concentric with the packing ring so that the packing ring does not swell toward the axis of the motor housing.

19 Claims, 7 Drawing Sheets

STATOR MAGNET WIRE END COIL RETENTION SYSTEM

PRIORITY

This application claims priority to U.S. Provisional Patent Application No. 61/594,741 titled "Stator Magnet Wire End Coil Retention System," filed on Feb. 3, 2012, the disclosure of which is incorporated herein by reference in its entirety.

BACKGROUND OF THE INVENTION

1. Field of the Invention

The present invention relates in general to a stator wire retainer for an electric motor, and in particular to a stator magnet wire retention system that can retain stator magnet wires without the use of encapsulants.

2. Brief Description of Related Art

Electric motors, such as the electric motors used in electrical submersible pumps ("ESP") include magnet wires in the stator for generating a magnetic field. The magnet wires typically include wires that run axially along the stator and then loop back, near an end of the stator, to run axially along the stator in the opposite direction. One wire, thus, will have multiple runs and loops. The loops at the ends must be restrained in order to hold the wires in place.

Magnet wires in electric motor stators are usually restrained from movement by an encapsulant such as varnish or epoxy. The encapsulant fills the voids around and between the magnet wires and hardens in place. Unfortunately, the encapsulants are degraded at high temperature and can fail to restrain the wires. Some motors, such as ESP motors in particular operating conditions, are difficult to cool and, thus, must operate at temperatures above the failure temperature of the encapsulants. Therefore, it is desirable to have an alternate technique for restraining magnet wires in an electric motor that is not susceptible to failure at high temperature.

SUMMARY OF THE INVENTION

In embodiments of the invention, an electric motor having a stator magnet wire retention system is described. The electric motor can be used to operate an electrical submersible pump to pump production fluid from a wellbore, or can be used for other application. In embodiments, the electric motor includes a housing, a winding, the winding comprising a magnet wire having a plurality linear segments running generally parallel to the axis of the housing and a plurality of end turns proximate to an end of the housing and connecting each linear segment, the plurality of linear segments and end turns being positioned around an inner diameter of the housing to define a winding inner diameter therethrough; a rotor positioned concentrically within the winding inner diameter; a lubricant within the housing to lubricate the rotor; and an annular coil packing ring, the coil packing ring being positioned proximate to the winding and at least a portion of the end turns of the winding to restrain movement of the end turns.

In embodiments, the lubricant causes the coil packing ring to swell. In embodiments, the coil packing ring comprises ethylene propylene dime monomer (M-class) rubber.

The coil packing ring can include a packing ring cylinder and a packing ring flange, at least a portion of the packing ring cylinder being positioned concentrically within the winding inner diameter and the packing ring flange being positioned proximate to the plurality of end turns.

Embodiments can include an annular pressure ring, the pressure ring providing rigid support to an inner diameter of the coil packing ring. An annular retainer ring can be used to prevent axial movement of the pressure ring in at least one direction. In embodiments, the coil packing ring swells from an initial state to a swelled state after being positioned in the coil inner diameter, the swelled state having a greater outer diameter than the initial state. A surface profile of the coil packing ring can match a contour of one or more portions of the winding in the swelled state. The annular pressure ring can provide rigid support to prevent the coil packing ring from swelling toward the axis of the housing. By swelling to match contours of the winding, there can be an absence of pressure points between the coil packing ring and the winding.

In embodiments of a method for securing a stator magnet wire, the method includes the steps of providing the stator magnet wire in a stator housing, the stator magnet wire having a plurality of linear runs each separated by one of a plurality of end turns; positioning an annular coil packing ring proximate to the plurality of end turns; and swelling the coil packing ring to a swelled state, the size of the coil packing ring in the swelled state being greater than the size of the coil packing ring in an initial state, the coil packing ring pressing against at least a portion of the plurality of end turns in the swelled state.

BRIEF DESCRIPTION OF THE DRAWINGS

So that the manner in which the features, advantages and objects of the invention, as well as others which will become apparent, are attained and can be understood in more detail, more particular description of the invention briefly summarized above may be had by reference to the embodiment thereof which is illustrated in the appended drawings, which drawings form a part of this specification. It is to be noted, however, that the drawings illustrate only a preferred embodiment of the invention and are therefore not to be considered limiting of its scope as the invention may admit to other equally effective embodiments.

DETAILED DESCRIPTION OF THE PREFERRED EMBODIMENT

The present invention will now be described more fully hereinafter with reference to the accompanying drawings which illustrate embodiments of the invention. This invention may, however, be embodied in many different forms and should not be construed as limited to the illustrated embodiments set forth herein. Rather, these embodiments are provided so that this disclosure will be thorough and complete, and will fully convey the scope of the invention to those skilled in the art. Like numbers refer to like elements throughout, and the prime notation, if used, indicates similar elements in alternative embodiments.

Figure 1:
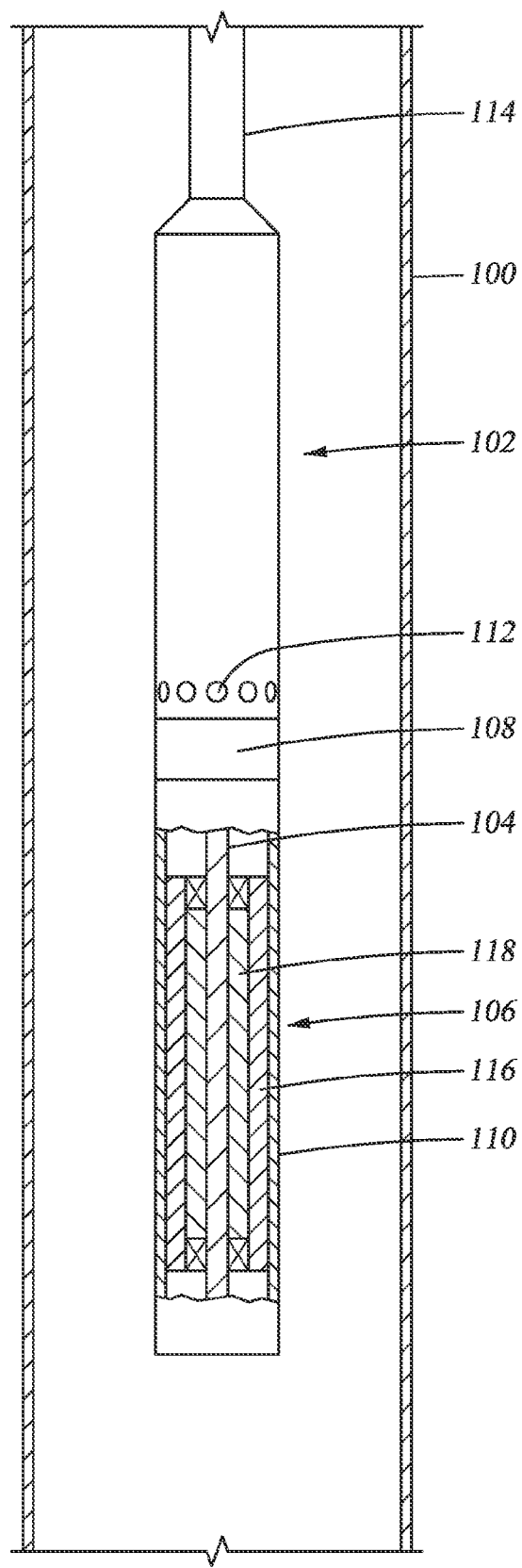
FIG. 1 is a partial sectional side view of an electrical submersible pump ("ESP") in a wellbore.

Referring to FIG. 1, wellbore casing 100 is shown in a vertical orientation, but it could be inclined. Pump 102 can be suspended inside casing 100 and is used to pump wellbore fluid up from a well. Wellbore fluid may be any kind of fluid including, for example, crude oil, water, gas, liquids, other downhole fluids, or fluids such as water that may be injected into a rock formation for secondary recovery operations. Indeed, wellbore fluid can include desired fluids produced from a well or by-product fluids that an operator desires to remove from a well. Pump 102 can be centrifugal or any other type of pump and may have an oil-water separator or a gas separator. Pump 102 can be driven by a shaft 104, operably connected to a motor 106. Seal section 108 can be mounted between the motor 106 and pump 102. The seal section can reduce a pressure differential between lubricant in the motor and well fluid. Motor 106 includes housing 110. Housing 110 can be a cylindrical housing, and typically encases the other components of motor 106. Preferably, the fluid produced by the well ("production fluid") flows past the exterior surface of housing 110, enters an intake 112 of pump 102, and is pumped up through tubing 114.

Figure 2:
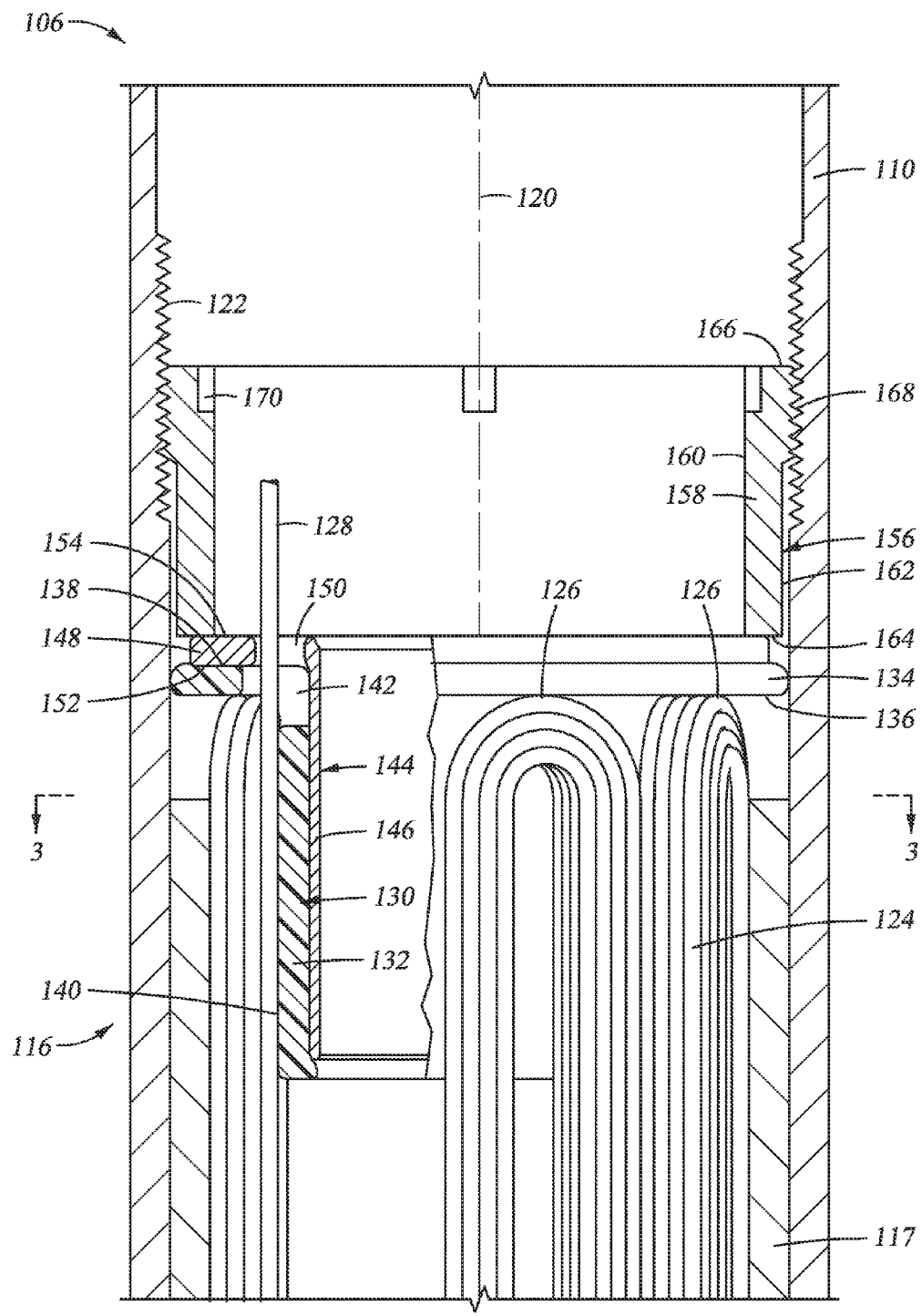
FIG. 2 is a sectional side view of an embodiment of a motor, of the ESP of FIG. 1, having an embodiment of a stator wire retention system.

Stator 116 can be stationarily mounted in housing 110. Stator 116 can include a large number of stator disks 117 (FIG. 3), also called laminations, having slots through them which are interlaced with wiring such as copper windings 124 (FIG. 2). In some embodiments, they can be three-phase copper windings. Alternatively, stator 116 can be made from other configurations such as, for example, solid components having slots for windings. Stator 116 can have an axial passage that extends through it.

Rotor 118 can be located within the stator 116 passage. In some embodiments, rotor 118 can be supported by or rotatably mounted on a plurality of bearings. The bearings can be located, for example, between the rotor and the stator or between the stator and each of the motor head and base. Rotor 118 can be mounted to shaft 104. Motor 106 has at least one rotor 118 and, in some embodiments, may have a plurality of rotors 118. Each of the rotors 118 are supported by bearings (not shown), the bearings being interspersed between the rotors. In embodiments, electric current, which can be direct current or alternating current, can be supplied to windings cause rotor 118 to rotate. Motor 106 may generate heat in a variety of ways. For example, friction caused by the rotation of rotor 118 can generate heat. Electrical resistance in the windings of stator 116 and rotor 118 can also generate heat. Indeed, a variety of electrical and mechanical components within motor 106 can generate heat. Furthermore, motor 106 can be subjected to a hot environment due to, for example, geothermal conditions.

Referring to FIG. 2, housing 110 can be a cylindrical housing of motor 106 having an axis 120 therethrough. Housing 110 can be any material including, for example, steel, stainless steel, or aluminum. Housing 110 can have cap threads 122 on an inner diameter surface. Cap threads 122 can extend to the end of housing 110 or, as shown in FIG. 2, a smooth inner surface can be located between the end of threads 122 and the end of housing 110. Stator 116, which can include windings 124 can be located within housing 110. Windings 124 can produce a magnetic field when current is applied. Windings 124 can generally run axially along housing 110 and each run of winding 124 can loop back at end turns 126. Some runs of winding 124 can lead to end wire 128, which can be a connected to, for example, a power connection (not shown). Housing 110 is filled with a lubricant, such as oil, to lubricate the moving parts within housing 110.

Referring to FIGS. 2-5, coil packing ring 130 can be a cylindrical ring having a packing ring body 132 and a packing ring flange 134 extending therefrom. Coil packing ring 130 can be radially expandable to exert radial pressure against winding 124. In one embodiment, coil packing ring 130 can be made of a material that can swell when exposed to various conditions. For example, coil packing ring 130 can be made of a rubber material such as ethylene propylene diene monomer (M-class) rubber ("EPDM"), which can swell or expand when exposed to oil. In embodiments, motor 106 is filled with a lubricating oil that also causes coil packing ring 130 to swell or expand. Other types of expandable materials can be used for coil packing ring 130. Coil packing ring 130 is in an initial state when installed and, upon being exposed to a condition causing it to swell, swells from the initial state to a swelled, or expanded, state.

Coil packing ring 130 can be concentrically located within housing 110 such that packing ring body 132 is coincident with windings 124. Winding facing surface 136 is a downward facing surface of packing ring flange 134. Winding facing surface 136 faces the ends of end turn 126 when packing ring body 132 is inserted within windings 124. Outer flange surface 138 is the surface of packing ring flange 134 opposite of winding facing surface 136. In one embodiment, packing ring body 132 can have an outer diameter such that outer surface 140 can contact or nearly contact the inner most diameter of windings 124. The outer diameter of packing ring flange 134 can be equal to or slightly less than an inner diameter of housing 110. Coil packing ring 130 can have one or more end wire apertures, such as aperture 142 in packing ring flange 134, for passing end wire 128. The thickness of coil packing ring 130, including the radial thickness of packing ring body 132 and the axial thickness of packing ring flange 134, can be selected based on the size and location of windings 124.

Figure 3:
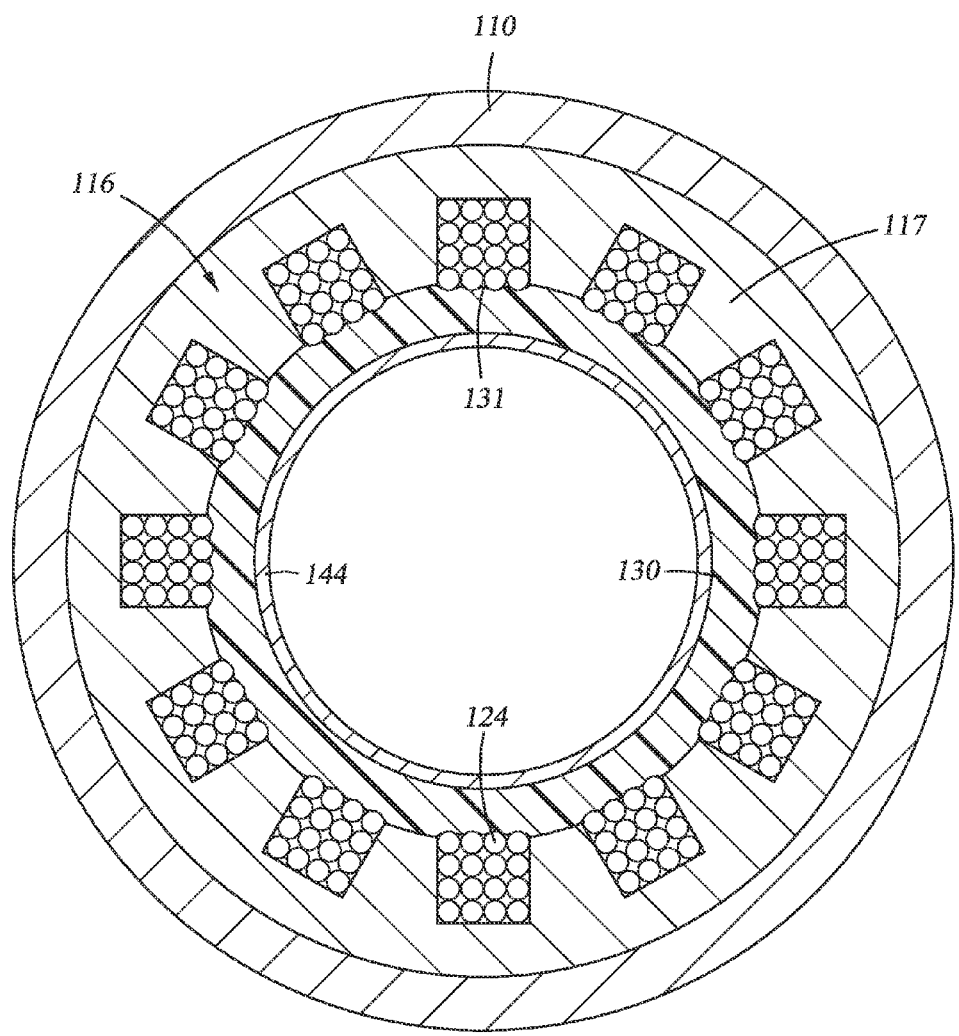
FIG. 3 is a sectional view of the motor of FIG. 2, taken along the 3-3 line.
Figure 4:
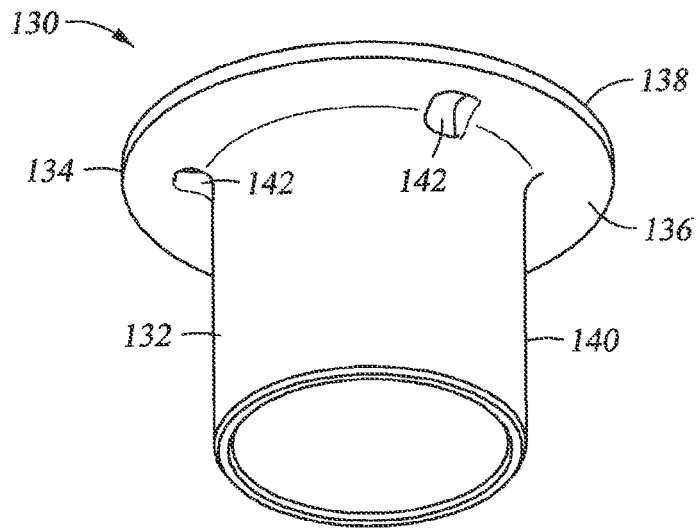
FIG. 4 is a perspective view of the coil packing ring of FIG. 2.
Figure 5:
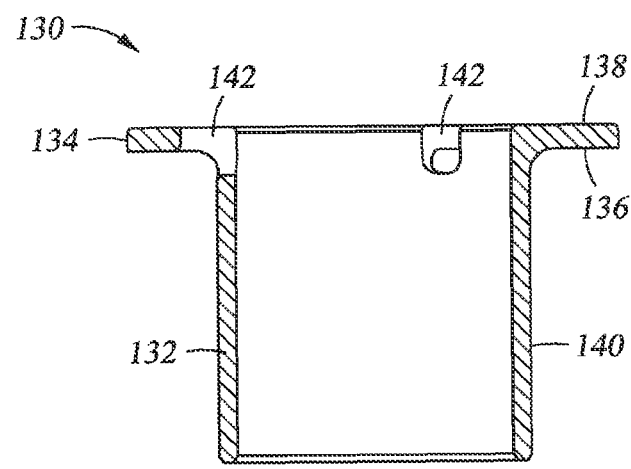
FIG. 5 is a side view of the coil packing ring of FIG. 2.

Referring to FIG. 3, coil packing ring 130 can swell or expand from an initial state to a swelled state, in response to motor lubricating oil or another type of fluid, the swelled state having a larger size than the initial state. Coil packing ring 130, thus, expands in the swelled state to contact windings 124 that were not initially in contact with coil packing ring 130 in the initial state. FIG. 3 shows coil packing ring 130 after expanding to the swelled state. In one embodiment, the expansion of packing ring 130 can be variable such that it can expand to fill an available space, but not create significant amounts of pressure against objects it contacts. Packing ring 130, thus, can effectively restrain a variety of winding 124 combinations and size configurations. In embodiments, the oil expansion causes packing ring 130 to exert relatively constant pressure. Soft packing ring 130, thus, can distribute the containment force of a hard compression ring across a wide area of the magnet wires, such as windings 124, thus avoiding "point loading" and subsequent damage to the wires, which could result in the electrical failure of the motor. Indeed, in the swelled state, coil packing ring 130 expands to assume the contours of windings 124 and, thus, not exert individual pressure points on windings 124. Therefore, in the swelled state, coil packing ring 130 has surface contours 131 that align with contours of windings 124.

Figure 6:
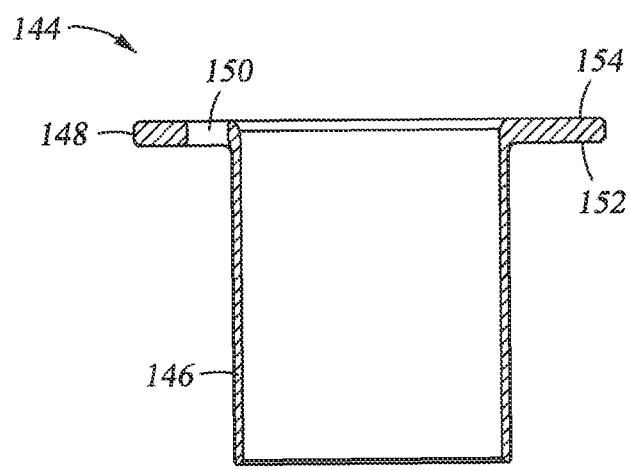
FIG. 6 is a sectional side view of the pressure ring of FIG. 2.

Referring to FIGS. 2, 3, and 6, pressure ring 144 can be a cylindrical ring having a cylindrical pressure ring body 146 and a pressure ring flange 148 extending therefrom. Pressure ring 144 can be a rigid or semi-rigid material including, for example, molded poly ether ether ketone ("PEEK"), polytetrafluoroethylene ("PTFE"), steel, aluminum, or other polymer or metal materials.

The axial length of pressure ring body 146 can be equal to or longer or shorter than the overall length of coil packing ring 130. The outer diameter of pressure ring body 146 can be equal, slightly smaller, or slightly larger than the inner diameter of packing ring body 132. The minimum inner diameter of pressure ring 144 is preferably greater than the maximum outer diameter of shaft 104 (FIG. 1). If pressure ring body 146 or packing ring body 132 are sufficiently pliable, the outer diameter of pressure ring body 146 can be slightly larger than the inner diameter of packing ring body 132. The outer diameter of pressure ring flange 148 can be equal to or smaller than the inner diameter of housing 110. In one embodiment, the outer diameter of pressure ring flange 148 can be greater than the inner diameter of coil packing ring 130. Pressure ring flange 148 can have one or more end wire apertures, such as pressure ring wire aperture 150. In one embodiment, pressure ring wire apertures 150 and one or more apertures 142 of packing ring 130 can be aligned such that an end wire 128 can pass though both of them. Cylinder facing surface 152 is the surface of pressure ring flange 148 facing toward pressure ring body 146. The opposite side of pressure ring flange 148, fixing away from pressure ring body 146, is outer flange surface 154.

Figure 7:
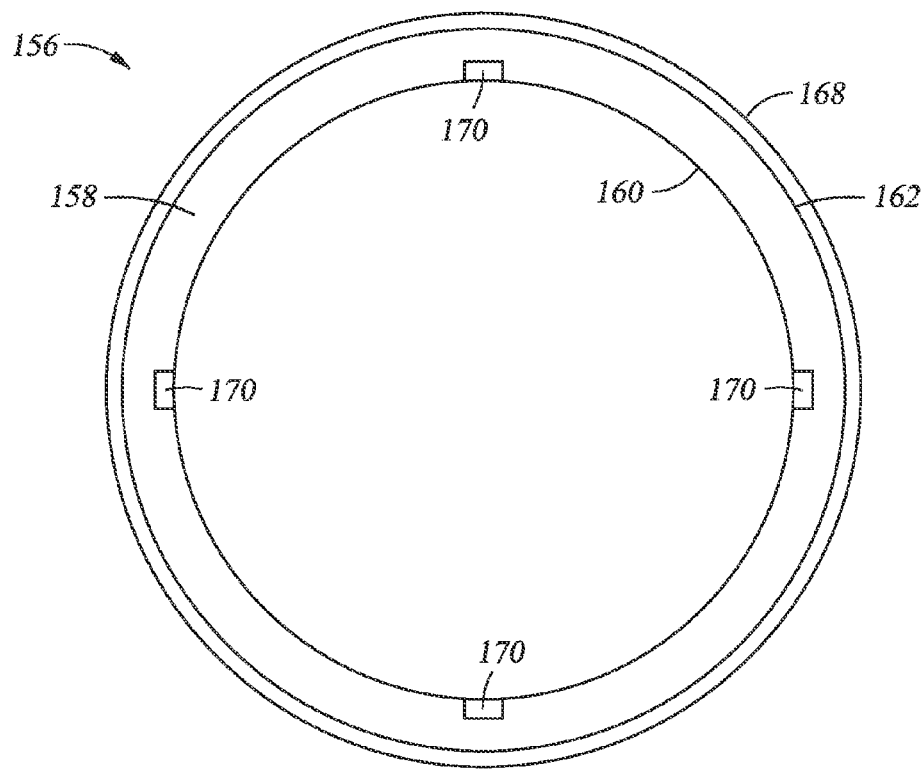
FIG. 7 is an end view of the compression ring of FIG. 2.
Figure 8:
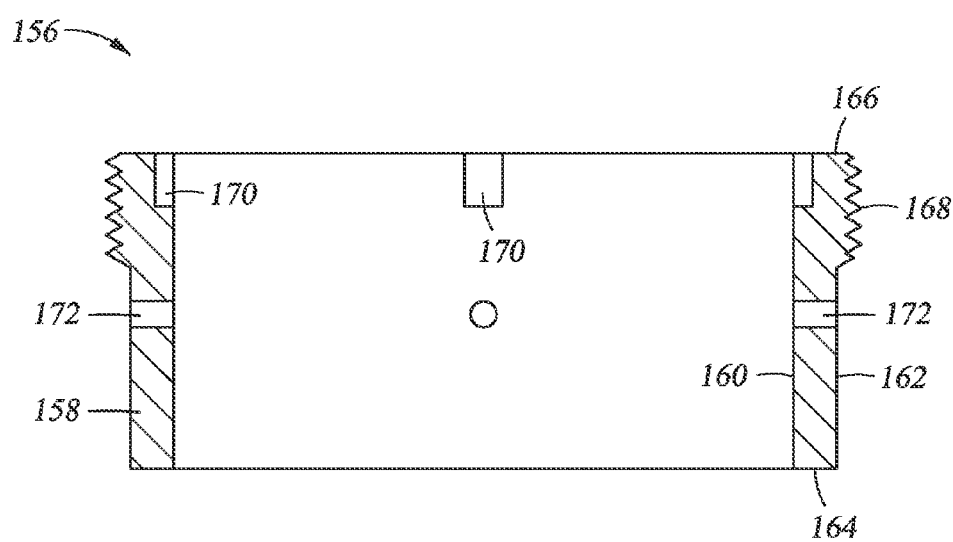
FIG. 8 is a sectional side view of the compression ring of FIG. 2.

Referring to FIGS. 2, 7 and 8, compression ring 156 can be an annular or cylindrical ring. Ring body 158 can be a cylindrical body having ring body inner diameter 160 and ring body outer diameter 162. Ring body outer diameter 162 can be greater than the inner diameter of pressure ring 144.

Ring body inner end surface 164 can be the surface at one end of ring body 158. Ring body outer end surface 166 can be the surface located at the end of ring body 158 opposite of ring body inner end surface 164. Compression ring 156 can have a connector for attaching ring body 158 to housing 110. In one embodiment, the connector can be ring body threads 168, which can be located somewhere on ring body outer diameter 162. In one embodiment, ring body threads 168 are located near the ring body outer end surface 166, as shown in FIGS. 2, 7 and 8. Ring body threads 168 can have an outer diameter that is greater than the outer diameter of ring body 158.

Compression ring 156 can have various tool receptacles. In one embodiment, tool receptacles can be slots 170, which can be slots or recesses on ring body outer end surface 166. Slots 170 can extend axially along ring body inner diameter 160 for a predetermined distance. Compression ring body 158 can have apertures 172 therethrough, which can be used, for example, to vent air when filling motor 106 with oil or to pass fluid such as oil through ring body 158. Any number of apertures 172 can be spaced apart around the circumference of ring body 158. In one embodiment, four apertures 172 are spaced equally apart around ring body 158, at about the axial midpoint of compression ring 156.

Figure 9:
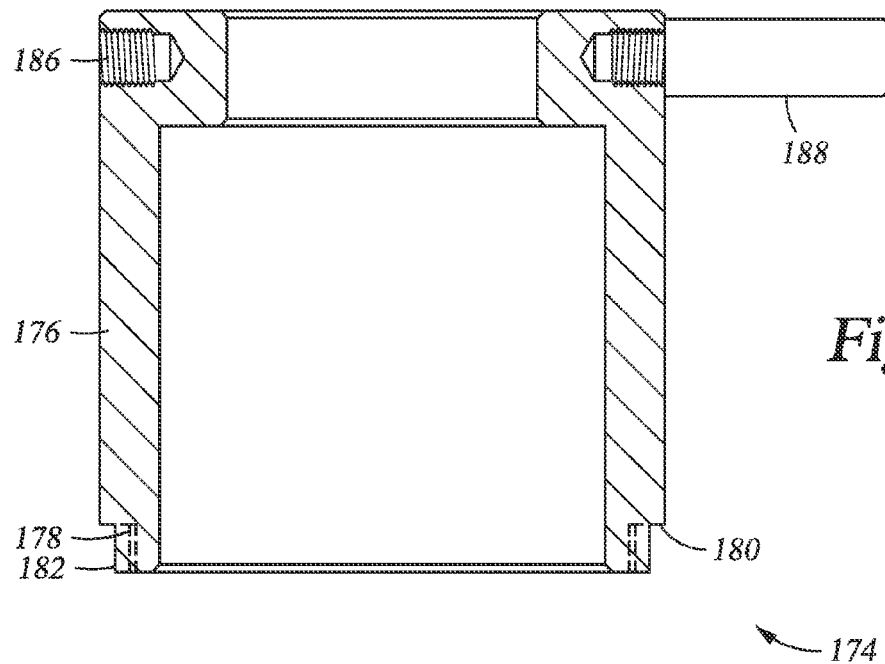
FIG. 9 is a sectional side view of a pressing ring tool of an embodiment of the stator wire retention system.
Figure 10:
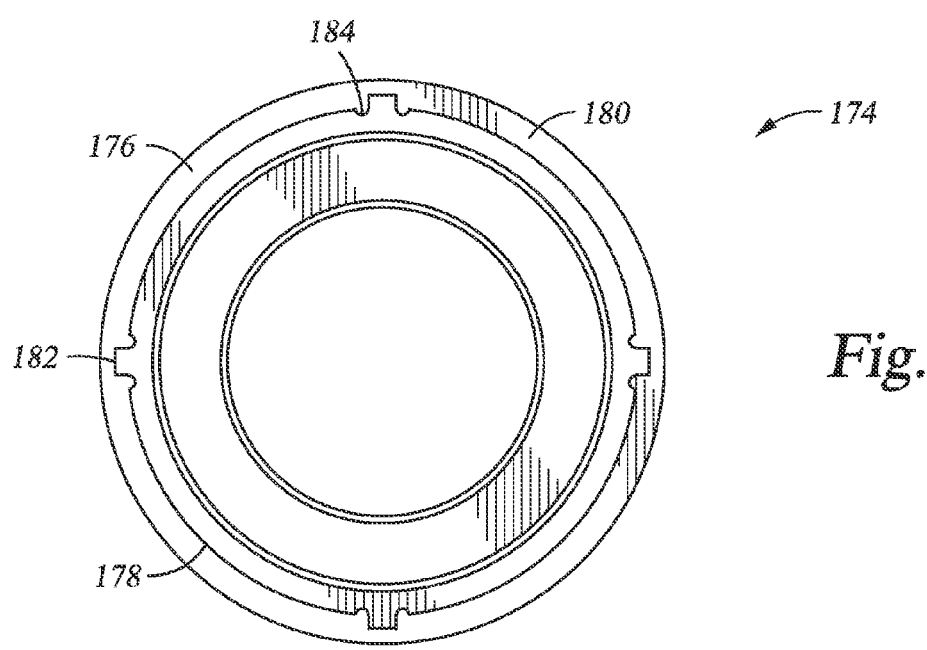
FIG. 10 is an end view of the pressing ring tool of FIG. 8.

Referring to FIGS. 9 and 110, pressing ring tool 174 can be used to rotate compression ring 156. Pressing ring tool 174 can have a cylindrical body 176, or body 176 can have a different shape. Body 176 can be a solid cylinder or a hollow or partially hollow cylinder, the inner diameter of which can be any diameter including, for example, the same diameter as the inner diameter of body 176 or an inner diameter of zero when body 176 is a solid cylinder. Rabbet 178 can be formed on an outer diameter of body 176 and can serve as a substrate to support engagement tabs 182. The outer diameter of rabbet 178 can be equal to or slightly smaller than the ring body inner diameter 160, or the inner diameter of ring body 158 near ring body threads 168. In one embodiment, the outer diameter of rabbet 178 is less than the outer diameter of body 176. Shoulder 180 can be located at the end of body 176.

Engagement tabs 182 can be protrusions that extend radially from rabbet 178 and axially from body 176. Radius 184 can be an axial indentation or groove at the base of tab 182. As one of skill in the art will appreciate, radius 184 can facilitate more efficient manufacturing of the part. One or more engagement tabs 182 can be spaced apart around pressing ring tool 174, provided that they can be aligned with slots 170. There can be fewer tabs 182 than slots 170. The dimensions of tabs 182 can be such that tabs 182 fit into slots 170.

One or more tool receptacles 186 can be located on pressing ring tool 174. In one embodiment, tool receptacles 186 can be threaded holes on the outer diameter of body 176. Handles 188 can engage tool receptacles 186. In one embodiment, handles 188 can be threaded and can engage threaded tool receptacles 186. In embodiments wherein tool receptacles 186 are on an outer diameter of pressing ring tool 174, the axial length of pressing ring tool 174 can be longer than the distance from ring body outer end surface 166 to the end of housing 110 so that tool receptacles 184 are exposed when tabs 182 engage slots 170. Body 176 can have a narrower inner diameter in the vicinity of tool receptacles 186 to provide sufficient body material to support threaded apertures. In alternative embodiments, a tool receptacle such as a square hole (not shown) can be located in an end plate (not shown) to receive a tool such as a square drive socket extension. In another alternative embodiment, tool receptacles can be aligned apertures (not shown) through the sidewall of body 176. A tool such as a rod can pass through two aligned apertures and be used to rotate pressing ring tool 174.

Referring back to FIG. 2, pressure ring 144 can be inserted into coil packing ring 130 either before or after coil packing ring 130 is inserted into housing 110. Pressure ring 144 is inserted until pressure ring body 146 is concentrically located within packing ring body 132 and pressure ring flange 148 contacts outer flange surface 138 of packing ring flange 134. Apertures 142 can each be aligned with one of pressure ring wire aperture 150. After the pressure ring 144 and coil packing ring 130 assembly are concentrically located within housing 110, end wires 128 can then be passed through aperture 142 and pressure ring wire aperture 150. Coil packing ring 130, with or without pressure ring 144, can be inserted into housing 110 until packing ring body 132 is concentrically located within a portion of windings 124 and winding facing surface 136 contacts or nearly contacts end turns 126. End wire 128 can pass through aperture 142. Outer surface 140 can contact or nearly contact windings 124.

Compression ring 156 can be inserted into housing 110 after pressure ring 144 is inserted. Pressing ring tool 174 can then be used to engage and rotate compression ring 156. As pressing ring tool 174 can be inserted and rotated until gagement tabs 182 enter slots 170. Handles 162 can be inserted into tool receptacles 186 and used to rotate pressing ring tool 174. As pressing ring tool 174 rotates, it rotates compression ring 156 along cap threads 122. The rotation can cause pressure ring 144 and packing ring 132 to move toward windings 124.

Ring body inner end surface 164 can contact outer flange surface 154 of pressure ring 144. As compression ring 156 is rotated, it advances axially to urge pressure ring 144 further into housing 110. In response, pressure ring 144 can advance axially to urge coil packing ring 130 further into housing 110, thereby exerting greater pressure against end turns 126 and windings 124. In embodiments where coil packing ring 130 is properly positioned before compression ring 156 is advanced, compression ring 156 and pressure ring 144 can be tightened until they are in a proper position to retain coil packing ring 130. In one embodiment, compression ring 156 is rotated until packing ring flange 134 contacts windings 124. In one embodiment, the adjustment provided by the rotation of compression ring 156, in conjunction with the subsequent expansion of packing ring 132, exerts an appropriate retention force on windings 124 without requiring different thicknesses of packing ring flange 134 to accommodate different winding configurations and dimensions.

After compression ring 156 is properly tightened against pressure ring 144, pressing ring tool 174 can be removed. As one of skill in the art will appreciate, compression ring 156 can be staked in place. Compression ring 156 can be prevented from rotating and thus backing off after installation, thus loosening and possibly permitting undesired motion of the windings 124 and 126. In one embodiment, compression ring notches 170 (FIGS. 6-7) can be staked with a punch or other suitable tool (not shown), thus deforming that part of compression ring 156 into the threads 122 of housing 110, creating an interference fit of the threads that prevents ring 156 movement. An alternative method is to form compression ring 156 threads 168 so that they have an interference fit with housing 110 threads 122.

If rotor 118 is not already installed, it can be installed and any other motor 106 components can be installed. Motor 106 can then be filled with oil. The oil can cause coil packing ring 130 to swell, thereby exerting greater radial and axial pressure on windings 124 and end turns 126. As packing ring 130 swells, pressure ring 144 prevents packing ring body 132 from swelling in an inward radial direction toward axis 120. The expansion of packing ring body 132, thus, is directed radially outward toward windings 124. Similarly, pressure ring flange 148 can prevent packing ring flange 134 from swelling in an axial direction toward the opening of housing 110 and, thus, direct the expansion of packing ring flange 134 toward end turns 126. Because packing ring 130 can swell to exert pressure against windings 124, windings 124 can be held in place by packing ring 130. In one embodiment, no epoxy or other encapsulant is required or used.

Figure 11:
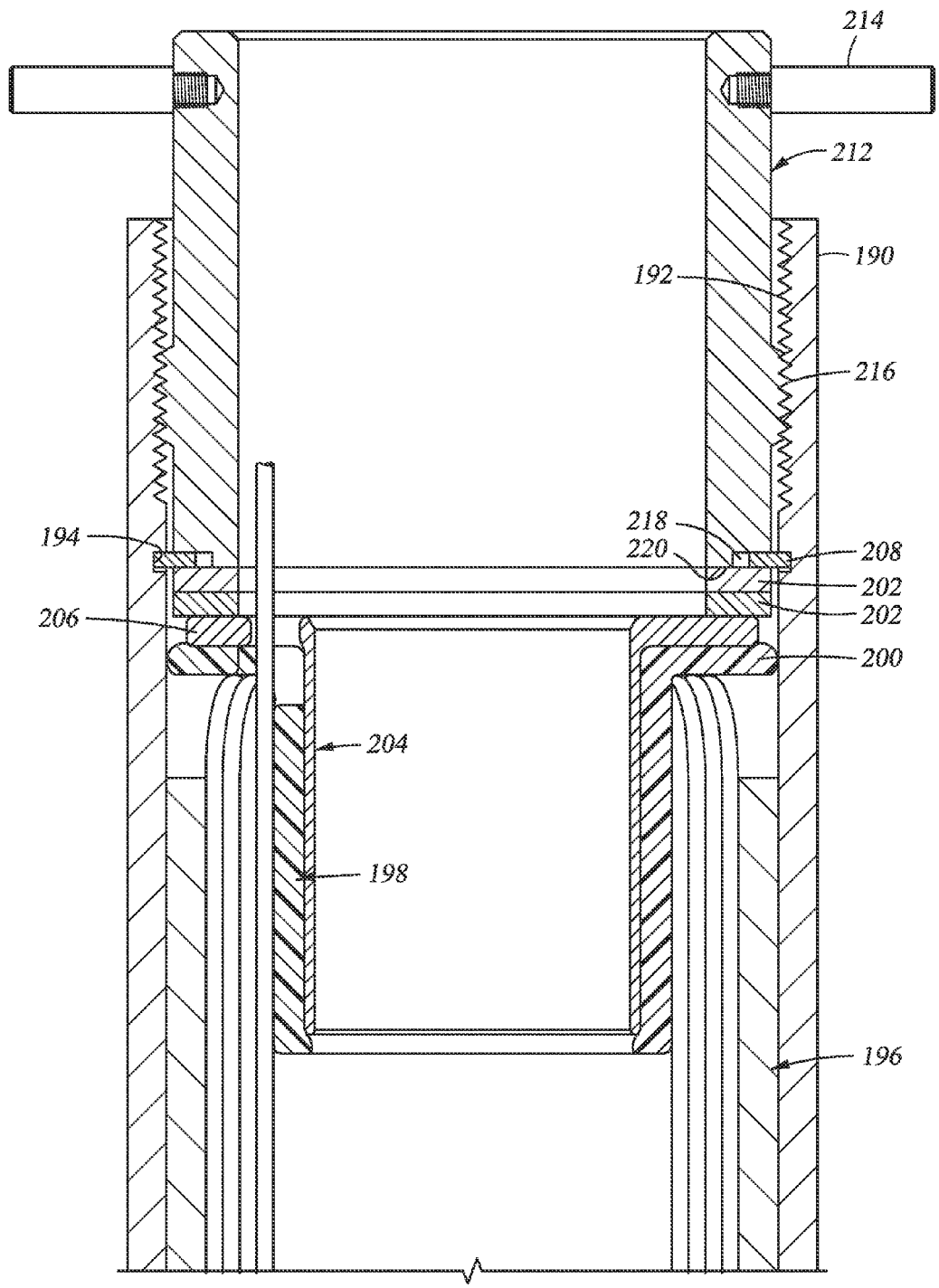
FIG. 11 is another embodiment of a stator wire retention system.

Referring to FIG. 11, in an alternative embodiment, housing 190 can have cap threads 192 and an annular groove 194 on its inner diameter surface. Windings 196 can be located within housing 190. Coil packing ring 198 can be installed concentrically within a portion of windings 196 with coil packing ring flange 200 abutting against the end turns of windings 196. Coil packing ring 198 can be made of a material that swells upon exposure to oil such as, for example, EPDM.

Pressure ring 204 can be installed through the bore of coil packing ring 198 such that at least a portion of pressuring ring 204 is concentric with coil packing ring 198. A pressure ring flange 206 extends radially from an end of pressure ring 204 and is positioned adjacent to coil packing ring flange 200.

One or more packing ring disks 202 can be installed between compression ring 206 and snap ring 208. Each packing ring disk 202 can be an annular ring having approximately the same inner and outer diameter as coil packing ring flange 200. Packing ring disks are a generally rigid material such as metal or a hard (but preferably not brittle) plastic, but other materials can be used. The number of packing ring disks can be selected based on factors such as the distance from cap threads 192 to windings 196, the distance from annular groove 194 to windings 196, and the desired axial pressure against windings 196.

If no packing ring disks 202 are used, then pressure ring flange is positioned between coil packing ring flange 200 and retaining ring 208. In embodiments (not shown), retaining ring disks 202 can be positioned between pressure ring flange 206 and packing ring flange 200.

Retaining ring 208, which can be an outwardly biased snap ring, can be inserted in groove 194. Retaining ring 208 can retain packing ring disks 200, and thus coil packing ring 198. A pressing ring tool 212 is used to exert axial pressure on packing ring disks 200 and, ultimately, on pressure ring flange 206 and packing ring flange 200. Pressing ring tool 212 can have handles 214, threads 216 on an outer diameter surface, and rabbet 218 on the outer diameter surface near pressure ring engagement surface 220. The outer diameter of rabbet 218 can be less than the inner diameter of retaining ring 208.

While the invention has been shown or described in only some of its forms, it should be apparent to those skilled in the art that it is not so limited, but is susceptible to various changes without departing from the scope of the invention.

What is claimed is:

1. An apparatus for pumping fluid from a well, the apparatus comprising:
    a pump adapted to pump production fluid from a wellbore;
    a motor assembly operably connected to the pump, the motor assembly comprising:
    a housing,
    a winding, the winding comprising a magnet wire having a plurality linear segments running generally parallel to the axis of the housing and a plurality of end turns proximate to an end of the housing and connecting each linear segment, the plurality of linear segments and end turns being positioned around an inner diameter of the housing to define a winding inner diameter therethrough;
    a rotor positioned concentrically within the winding inner diameter;
    a lubricant within the housing to lubricate the rotor;
    an annular coil packing ring, the coil packing ring being positioned proximate to the winding and at least a portion of the end turns of the winding to restrain movement of the end turns; and
    wherein the coil packing ring comprises a packing ring cylinder and a packing ring flange, at least a portion of the packing ring cylinder being positioned concentrically within the winding inner diameter and the packing ring flange being positioned proximate to the plurality of end turns.

2. The apparatus according to claim 1, wherein the lubricant causes the coil packing ring to swell.

3. The apparatus according to claim 1, wherein the coil packing ring comprises ethylene propylene diene monomer (M-class) rubber.

4. The apparatus according to claim 1, further comprising an annular pressure ring, the pressure ring providing rigid support to an inner diameter of the coil packing ring.

5. The apparatus according to claim 4, further comprising an annular retainer ring, the retainer ring preventing axial movement of the pressure ring in at least one direction.

6. The apparatus according to claim 1, wherein the coil packing ring swells from an initial state to a swelled state after being positioned in the winding inner diameter, the swelled state of the packing ring cylinder having a greater outer diameter than the initial state.

7. The apparatus according to claim 1, wherein the coil packing ring swells from an initial state to a swelled state after being positioned in the winding inner diameter, an outer diameter profile of the packing ring cylinder matching a contour of one or more portions of the winding inner diameter in the swelled state.

8. The apparatus according to claim 7 further comprising an annular pressure ring, the annular pressure ring providing rigid support to prevent the coil packing ring from swelling toward an axis of the housing.

9. The apparatus according to claim 7, further comprising an absence of pressure points between the coil packing ring and the winding.

10. An electric motor, the electric motor comprising:
a housing,
a winding, the winding comprising a magnet wire having a plurality linear segments running generally parallel to the axis of the housing and a plurality of end turns proximate to an end of the housing and connecting each linear segment, the plurality of linear segments and end turns being positioned around an inner diameter of the housing to define a winding inner diameter therethrough;
a rotor positioned concentrically within the winding inner diameter;
an annular coil packing ring, the coil packing ring comprising a packing ring cylinder and a packing ring flange, at least a portion of the packing ring cylinder being positioned concentrically within the winding inner diameter and the packing ring flange being positioned proximate to the plurality of end turns, and at least a portion of the coil packing restraining movement of the end turns; and
a lubricant within the housing to lubricate the rotor, the lubricant causing the coil packing ring to swell from an initial position to a swelled position, the swelled position exerting more pressure against the coil than the initial position.

11. The electric motor according to claim 10, wherein the coil packing ring comprises ethylene propylene diene monomer (M-class) rubber.

12. The electric motor according to claim 10, further comprising an annular pressure ring, the annular pressure ring providing rigid support to an inner diameter of the coil packing ring.

13. The electric motor according to claim 12, further comprising an annular retainer ring, the retainer ring preventing axial movement of the pressure ring in at least one direction.

14. The electric motor according to claim 10, wherein an outer diameter profile of the coil packing ring assumes a contour of one or more portions of the winding in the swelled state.

15. The electric motor according to claim 10, further comprising an absence of pressure points between the coil packing ring and the winding.

16. An apparatus for pumping fluid from a well, the apparatus comprising:
a pump adapted to pump production fluid from a wellbore;
a motor assembly operably connected to the pump, the motor assembly comprising:
a housing having an axis;
a winding, the winding comprising a magnet wire having a plurality linear segments running generally parallel to the axis of the housing and a plurality of end turns proximate to an end of the housing and connecting each linear segment, the plurality of linear segments and end turns being positioned around an inner diameter of the housing to define a winding inner diameter therethrough;
a rotor positioned concentrically within the winding inner diameter;
a lubricant within the housing to lubricate the rotor;
an annular coil packing ring, the coil packing ring having a packing ring cylinder positioned proximate to and within the winding inner diameter and at least a portion of the end turns of the winding to restrain movement of the end turns; and
an annular securing ring in the housing in engagement with the coil packing ring to prevent axial movement of the coil packing ring relative to the housing.

17. The apparatus according to claim 16, wherein:
the securing ring comprises a compression ring having external threads that engage internal threads in the housing.

18. The apparatus according to claim 16, wherein:
the securing ring comprises an outward biased retaining ring.

19. The apparatus according to claim 16, wherein:
the winding extends through a stack of stator disks, and the end turns protrude beyond an end of the stack of stator disks;
the winding inner diameter comprises a stator disks inner diameter of the stator disks and an end turn inner diameter defined by the end turns; and
the packing ring cylinder is located within the end turn inner diameter and extends into the stator disks inner diameter.

* * * * *